US008075064B2

(12) United States Patent
Johnson

(10) Patent No.: US 8,075,064 B2
(45) Date of Patent: Dec. 13, 2011

(54) MULTIPLE SECTION WHEEL ASSEMBLY

(76) Inventor: Gregory Joe Johnson, Destrehan, LA (US)

( * ) Notice: Subject to any disclaimer, the term of this patent is extended or adjusted under 35 U.S.C. 154(b) by 37 days.

(21) Appl. No.: 12/587,557

(22) Filed: Oct. 9, 2009

(65) Prior Publication Data

US 2010/0133895 A1 Jun. 3, 2010

Related U.S. Application Data

(60) Provisional application No. 61/197,457, filed on Oct. 27, 2008.

(51) Int. Cl.
*B60B 35/00* (2006.01)
*B60B 27/00* (2006.01)
(52) U.S. Cl. .................................. 301/124.1; 301/105.1
(58) Field of Classification Search .................. 301/6.1, 301/105.1, 111.01, 111.03, 124.1, 126, 131, 301/132, 137; 403/1
See application file for complete search history.

(56) References Cited

U.S. PATENT DOCUMENTS

| | | | | | |
|---|---|---|---|---|---|
| 2,858,163 | A | * | 10/1958 | Nagel | 301/1 |
| 3,167,357 | A | * | 1/1965 | Savin | 301/1 |
| 4,029,423 | A | * | 6/1977 | Sager | 403/3 |
| 4,089,610 | A | * | 5/1978 | Kleespies et al. | 403/1 |
| 4,337,003 | A | * | 6/1982 | Juhl | 403/1 |
| 4,555,197 | A | * | 11/1985 | Erickson | 403/1 |
| 4,610,558 | A | * | 9/1986 | Erickson | 403/1 |
| 4,621,723 | A | * | 11/1986 | Carlson | 192/71 |
| 4,856,633 | A | * | 8/1989 | Specht | 192/69.4 |
| 5,429,204 | A | * | 7/1995 | Tuholski | 180/247 |
| 6,065,893 | A | * | 5/2000 | Montanez, Jr. | 403/1 |
| 6,254,196 | B1 | * | 7/2001 | Gee | 301/124.1 |
| 6,619,456 | B1 | * | 9/2003 | Juhl | 192/69.43 |
| 7,641,289 | B2 | * | 1/2010 | Batdorff et al. | 301/137 |
| 2008/0296964 | A1 | * | 12/2008 | Williams | 301/105.1 |
| 2010/0266331 | A1 | * | 10/2010 | Peterkort | 403/26 |

* cited by examiner

*Primary Examiner* — Kip T Kotter

(57) ABSTRACT

The invention provides motorist a lock-unlock wheel that rotates independently around its center hub, which remains mounted to the axle of a subject vehicle. The rim allows vehicles to be towed without vehicle axle rotation, while eliminating odometer reading due to towing. The invention comprises an inner hub spindle that is able to be unlocked from the wheel, allowing for independent rotation of the inner spindle. And, when unlocked via a bolting system, the invention's wheel section rotates while also eliminating effects of a vehicle drive and brake system while the vehicle is in tow.

2 Claims, 3 Drawing Sheets

MULTIPLE SECTION WHEEL ASSEMBLY

PRIOR PROSECUTION HISTORY

The present invention claims the benefit of provisional patent application No. 61/197,457, filed Oct. 27,2008 which is hereby incorporated by reference in its entirety.

BACKGROUND AND SUMMARY

The present invention is unlike regular one piece wheels or rims, in that the present invention's wheel can rotate independent of any subject vehicle's drive system or can rotate in conjunction with said vehicle's drive system when the center hub and wheel of the present invention are coupled/locked together via a bolting or locking method. And, when mounted to said vehicle, the present invention, allows the uncoupling of the wheel from the center hub/spindle section, permitting a subject vehicle to be moved without interference of the vehicle's braking and drive systems; and the towing or pushing of a vehicle without necessity to un-mount the present invention from said vehicle's axles.

The present invention, also unlike present one piece wheels or rim, incorporates a bearing and race system which allows the center hub/spindle and wheel of the present invention to freely rotate relative to one another.

DETAILED DESCRIPTION

Figure 1:
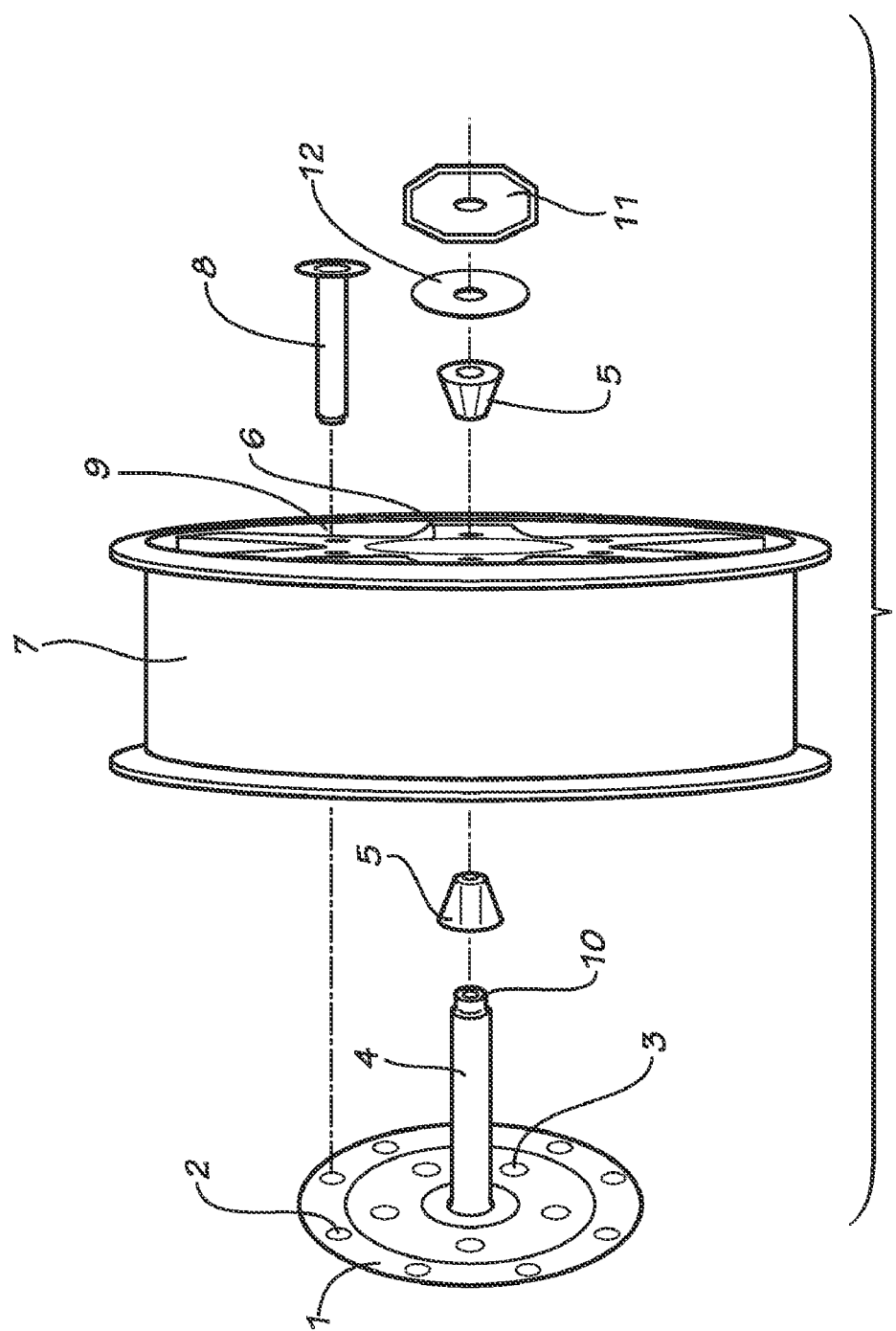
FIG. 1: Exploded View of the invention.
Figure 2:
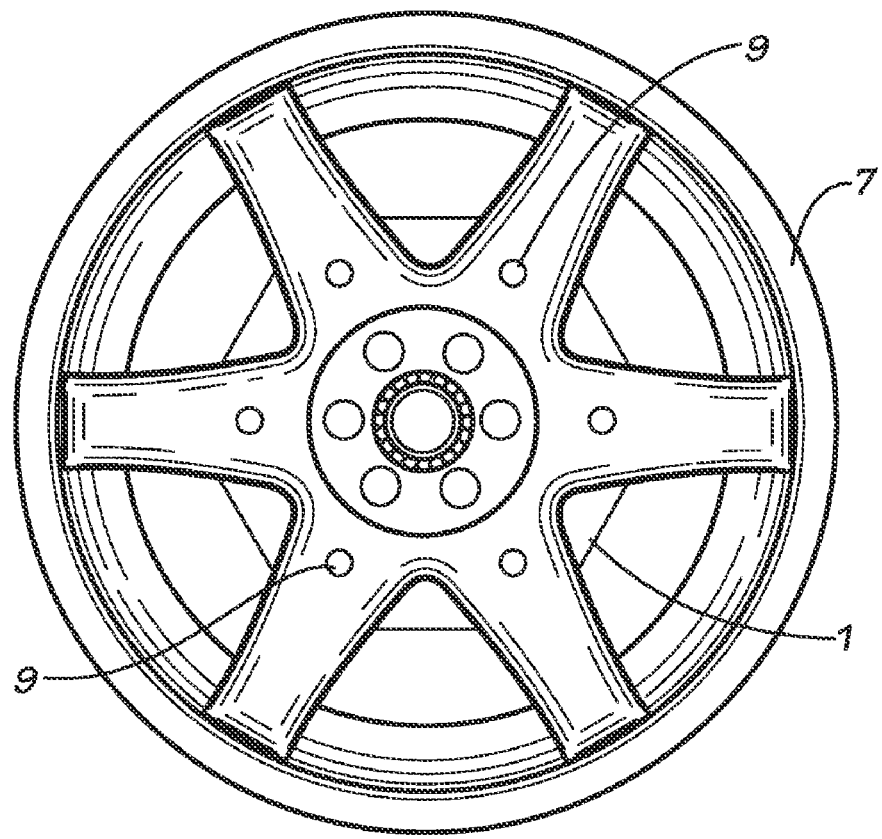
FIG. 2: Front View of the wheel portion of the invention.
Figure 3:
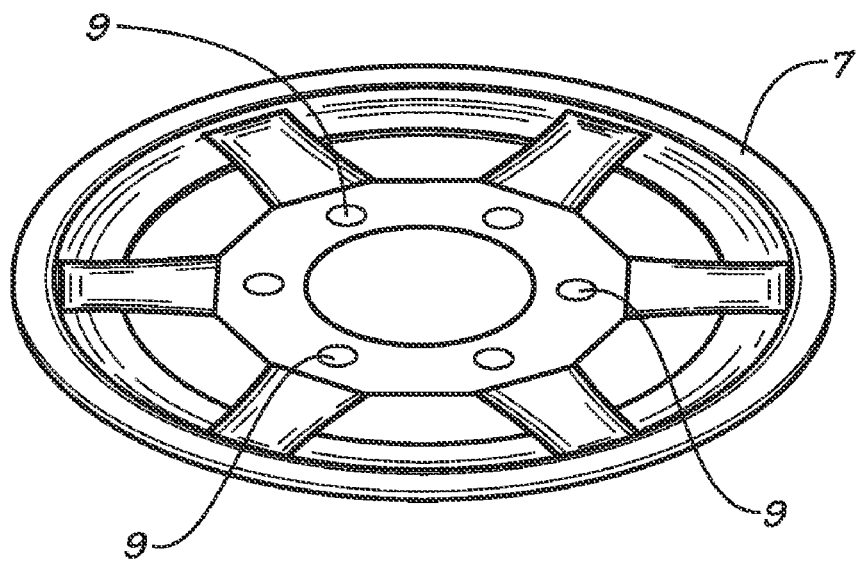
FIG. 3: Rear View of the wheel portion of the invention.
Figure 4:
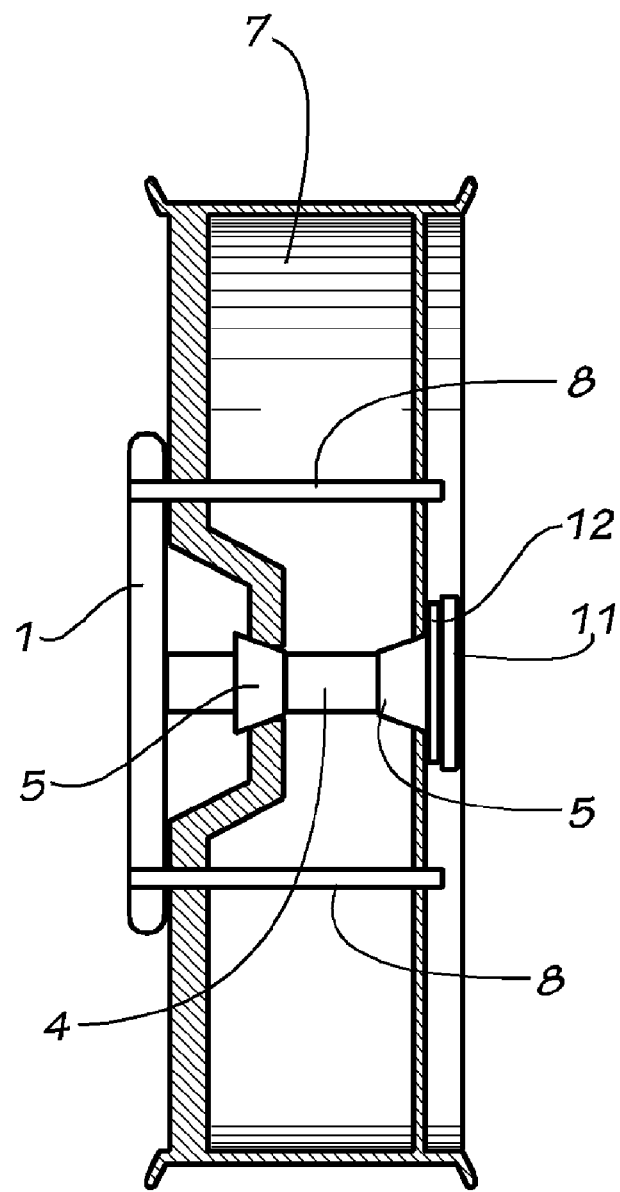
FIG. 4: Cross-sectional view of the wheel portion of the invention.

1. The present invention is a wheel which incorporates separate sections of said wheel or rim which via bearing and race system allows each section to freely and independently rotate via the bearing and race system when the sections are uncoupled/unbolted from its other section. Reference character 1 shows and represents the center hub/spindle section of the present invention which allows the mounting of the present invention to any subject vehicle via a plurality of mounting holes, in a generally circular pattern, shown and represented in Reference character 3.
2. A wheel which when each section (inner center and outer) are coupled/bolted/pinned together operates as any ordinary, one piece wheel/rim. Reference character 2 shows and represents a plurality of threaded holes, in a generally circular pattern, and radially outside the circumference of the mounting holes, system of Reference character 1 which allows the present invention to be bolted or unbolted from the present invention's wheel Reference character 7, via the invention's plurality of threaded bolts, represented and shown in Reference character 8.
3. Reference character 3 shows and represents the present invention's plurality of mounting holes which allows the mounting to any vehicle's axle. Reference character 4 represents the spindle arm of Reference character 1 which accommodates the bearing system, Reference character 5. Reference character 5 represents and shows the present invention's bearing system which mounts onto the spindle arm, Reference character 4, thereby allowing the outer wheel to mount and freely rotate via the bearing system shown and represented in Reference character 5. Reference character 6 shows and represents the present invention's plurality of race systems of Reference character 7 which mount onto and accommodates the bearing system shown in Reference character 5. Reference character 7 shows and represents the present invention's wheel which rotates via the plurality of race systems in Reference character 6 which freely turn via the bearing system represented in Reference character 5.
4. Reference character 8 shows and represents a plurality of bolts system which when threaded/coupled via the threaded holes represented in Reference character 2, allows the present invention the functionality of a single piece wheel.
5. Reference character 9 shows and represents holes in the axial outboard face of the wheel which accommodates the bolts represented in Reference character 8; which said bolts system are either engaged or disengaged from the present invention via Reference character 9. Reference character 10 shows and represents the present invention's threaded spindle end, which receives and accommodates the present invention locking washer, Reference character 12; and locking nut, Reference character 11, thereby securing the center hub/spindle, Reference character 1 and bearing system, Reference character 5, to the wheel, Reference character 7.

While particular embodiment of the invention is shown and described, it is apparent to those skilled in the art that modifications are possible without departing from the spirit and scope of the invention. The embodiments of the invention in which an exclusive property or privilege are claimed.

The invention claimed is:
1. A multiple section wheel assembly comprising:
  a. a center hub/spindle comprising:
    i. a spindle arm having a threaded end;
    ii. a plurality of mounting holes configured in a generally circular pattern about said spindle arm and shaped to operatively engage a vehicle; and
    iii. a plurality of threaded holes configured in a generally circular pattern about said spindle arm and radially outside the circumference of said mounting holes;
  b. at least one bearing system configured to operatively engage said spindle arm;
  c. a wheel operatively configured to engage said spindle comprising:
    i. a plurality of holes in a generally circular pattern in an axial outboard face of said wheel; and
    ii. at least one race system configured to operatively engage said bearing system on said spindle arm;
  d. at least one threaded bolt shaped to fit within said plurality of holes in an axial outboard face of said wheel and configured to detachably connect to said plurality of threaded holes in said center hub/spindle;
  e. at least one lock washer configured to engage said spindle; and
  f. at least one locking nut configured to be detachably connected to said threaded end of said spindle and configured to retain said bearing system and said race system.
2. A multiple section wheel assembly comprising:
  a. a center hub/spindle comprising:
  i. a spindle arm having a threaded end;
  ii. a plurality of mounting holes configured in a generally circular pattern about said spindle arm and shaped to operatively engage a vehicle; and
  iii. a plurality of threaded holes configured in a generally circular pattern about said spindle arm and radially outside the circumference of said mounting holes;
  b. at least one bearing system configured to operatively engage said spindle arm;

c. a wheel operatively configured to engage said spindle comprising:
  i. a plurality of holes in a generally circular pattern in an axial outboard face of said wheel; and
  ii. at least one race system configured to operatively engage said bearing system on said spindle arm;
d. at least one threaded bolt shaped to fit within said plurality of holes in said axial outboard face of said wheel and configured to detachably connect to said plurality of threaded holes in said center hub/spindle; and
e. at least one locking nut configured to be detachably connected to said threaded end of said spindle and configured to retain said bearing system and said race system.

* * * * *